H. N. POTTER.
METHOD OF PRODUCING AND UTILIZING OZONE.
APPLICATION FILED JAN. 6, 1904.
905,361.
Patented Dec. 1, 1908.
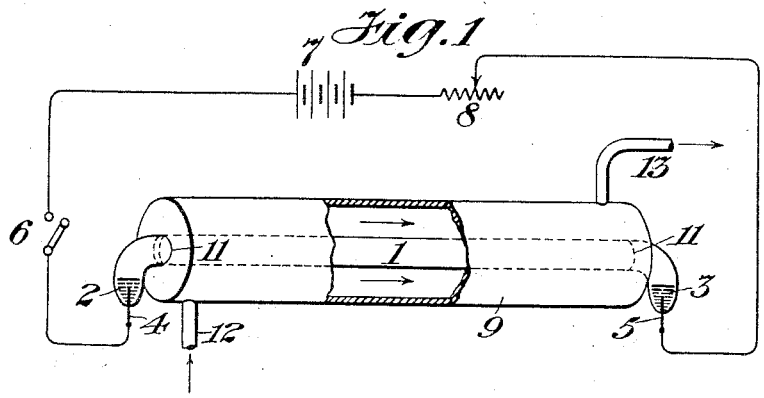
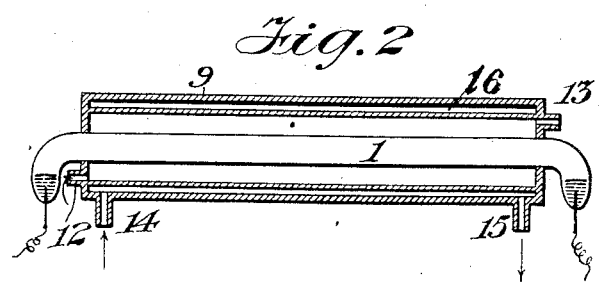
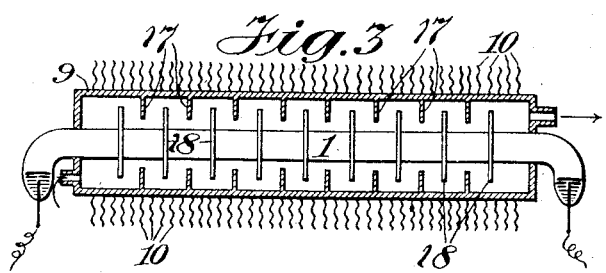
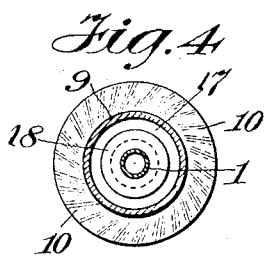
Witnesses
Chas. F. Clagett
Wm. H. Capel
Inventor
Henry Noel Potter
By his Attorney
Charles A. Terry.

UNITED STATES PATENT OFFICE.

HENRY NOEL POTTER, OF NEW ROCHELLE, NEW YORK, ASSIGNOR TO COOPER HEWITT ELECTRIC COMPANY, OF NEW YORK, N. Y., A CORPORATION OF NEW YORK.

METHOD OF PRODUCING AND UTILIZING OZONE.

No. 905,361.

Specification of Letters Patent.

Patented Dec. 1, 1908.

Application filed January 6, 1904. Serial No. 187,865.

*To all whom it may concern:*

Be it known that I, HENRY NOEL POTTER, a citizen of the United States, and resident of New Rochelle, county of Westchester, State of New York, have invented certain new and useful Improvements in the Methods of Producing and Utilizing Ozone, of which the following is a specification.

My invention relates to an improved process of obtaining ozone and storing it in a suitable container or applying it directly to use.

It is found that ozone is developed in large quantities when electric current is passed through an inclosing tube or vessel made of a material which is pervious to the ultra-violet rays. For example, when the tube or container of silica is provided with electrodes inside the tube, one of the electrodes being of some volatilizable material, such as mercury, and an electric current is caused to traverse the space between the electrodes, ozone is developed in large quantities in the air outside of and about the tube. Under such conditions it sometimes becomes necessary to protect the operators of the apparatus from the effects of the ozone, as by surrounding the apparatus by an ozone containing vessel of some material which is impervious to the ultra-violet rays, such as ordinary glass.

The object of the present invention is to provide means whereby the qualities belonging to an apparatus of the character described above may be utilized for developing ozone as set forth, and whereby the ozone developed may be collected for storage or for application to immediate use, according to circumstances or requirements.

The present invention consists in surrounding an ozone generator of the kind described, with an envelop which is opaque to the ultra-violet rays though not necessarily for other wave lengths and which preferably presents to the generator a polished or diffusely reflecting surface, and collecting or using the ozone generated. An inclosing vessel of this sort being provided with an air inlet passage and with an outlet passage at its opposite ends, permits of the rapid and continuous generation of ozone and of its being conducted to a suitable reservoir or to a point where it may be directly utilized without being stored. In some instances, I may provide special cooling means, such as a water-jacket, around the outside containing vessel, to carry off the excess of heat developed in the operation of the ozone generating apparatus. I may also cause the air to pass through a zig-zag or tortuous path between the inlet and the outlet, whereby the development of ozone may be materially increased.

The apparatus which generates ozone in the manner described may also be a source of light, and the devices made use of for storing or applying the ozone may be so constructed and arranged as to interfere very little with the utility of the device as a light giving source.

My invention will be understood by reference to the accompanying drawings in which Figure 1 is a partly sectional view of an apparatus embodying my invention, together with a diagram of the electrical circuits; Fig. 2 is a longitudinal section of a modified form of apparatus; and Figs. 3 and 4 are respectively, a longitudinal and a cross section of another modification.

Referring to the first figure of the drawings, 1 is a tube of silica, or other medium sufficiently pervious to ultra-violet radiation, the said tube containing electrodes, 2 and 3, which are here represented as of mercury. One of the said electrodes, say the positive, may be of iron or other solid material, and the other of mercury or some other volatilizable material, but it is convenient to represent them as being both composed of mercury. Lead-wires, 4 and 5, are connected to the respective electrodes, 2 and 3, through the walls of the tube 1, and the said lead-wires are connected through a suitable switch, 6, to a generator, 7, and a resistance or reactance device, 8. The circuit shown is simply typical of an electric circuit suited for operating the apparatus, it being understood that means not herein illustrated may be utilized for causing an initial flow of current through the apparatus. Around the tube 1, I may place a tube 9, of silver, glass or other reflecting material. The tube 9 may be sealed to the tube 1, as indicated at 11 in Fig. 1. At 12 I show an inlet tube for air or oxygen, and at 13 an outlet tube, which may extend to a reservoir (not shown) or to a point or points where the ozone is to be directly utilized for any suitable purpose.

In operation the air or oxygen entering at the tube 12 is subjected to the influence of the ozonizing radiation which traverses the silica tube 1 and is ozonized within the tube 8, the products of ozonization being carried off through the tube 13.

Fig. 2 represents a construction generally similar to that shown in Fig. 1, but in the device illustrated in Fig. 2 the air inlet 12 and ozone outlet, 13, pass through the ends of the tube 9 and inlet and outlet pipes or tube, shown at 14 and 15, respectively, pass into the outer walls of the tube 9 which in this instance is shown as a double tube having an annular space, 16, through which water may be caused to circulate for cooling purposes.

In Fig. 3, the interior of the tube 9 and the exterior of the tube 1 are provided with alternate sets, 17 and 18, of rings, as shown, whereby the air entering the inlet pipe, 12, is caused to pass through a zig-zag or tortuous path between the walls of the respective tubes, whereby a higher degree of ozonization is secured. In this figure and in Fig. 4, I show cooling vanes, 10, consisting of corrugated rings extending outward from the exterior of the tube 9. To facilitate the circulation of the air or oxygen through the annular space between the generator and the outer envelop I may employ any suitable pump, fan or other device.

In a divisional application filed January 20th, 1905, Serial Number 241,936, claims are made upon the apparatus described herein.

I claim as my invention:—

The method of producing and utilizing ozone, which consists in passing an electric current between electrodes inside a container pervious to ozonizing radiation, preventing a dissipation of the ozone and transmitting the ozone generated to a selected point.

Signed at New York, in the county of New York, and State of New York, this 31st day of December A. D. 1903.

HENRY NOEL POTTER.

Witnesses:
WM. H. CAPEL,
GEORGE H. STOCKBRIDGE.